United States Patent
Dewey et al.

(10) Patent No.: US 9,582,832 B1
(45) Date of Patent: Feb. 28, 2017

(54) METHOD FOR FIELD IDENTIFICATION OF ROOFING MATERIALS

(71) Applicant: STATE FARM MUTUAL AUTOMOBILE INSURANCE COMPANY, Bloomington, IL (US)

(72) Inventors: Douglas L. Dewey, Bloomington, IL (US); Rosemarie Geier Grant, Ellsworth, IL (US); Joshua M. Mast, Bloomington, IL (US); Taryn M. Madey, Bloomington, IL (US); Sharon Gibson, Carlock, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/841,810

(22) Filed: Sep. 1, 2015

(51) Int. Cl.
*G06Q 40/00* (2012.01)
*G06Q 40/08* (2012.01)

(52) U.S. Cl.
CPC .................................. *G06Q 40/08* (2013.01)

(58) Field of Classification Search
CPC ........ G06Q 10/00; G06Q 20/00; G06Q 30/00; G06Q 40/00
USPC ...................................... 705/3–44
See application file for complete search history.

(56) References Cited

U.S. PATENT DOCUMENTS

| | | | | |
|---|---|---|---|---|
| 7,627,502 | B2 * | 12/2009 | Cheng .................... | G06Q 30/02 705/26.8 |
| 8,977,033 | B1 * | 3/2015 | Maurer ................ | G06K 9/6202 348/137 |
| 9,384,542 | B1 * | 7/2016 | Maurer .................... | G06T 7/408 |
| 2011/0025876 | A1 * | 2/2011 | Denzler ............ | G06F 17/30256 348/222.1 |
| 2011/0157226 | A1 * | 6/2011 | Ptucha .................... | G06T 11/60 345/638 |
| 2012/0231425 | A1 * | 9/2012 | Calman .............. | G06K 9/00671 434/93 |
| 2013/0110605 | A1 * | 5/2013 | Grossman .............. | G06Q 30/02 705/14.25 |
| 2014/0025433 | A1 * | 1/2014 | Leger ................. | G06Q 30/0206 705/7.35 |
| 2015/0228086 | A1 * | 8/2015 | Maurer ................... | G06T 7/408 382/100 |
| 2016/0048934 | A1 * | 2/2016 | Gross ................. | G06K 9/00637 705/313 |

* cited by examiner

*Primary Examiner* — Frantzy Poinvil
(74) *Attorney, Agent, or Firm* — Marshall, Gerstein & Borun LLP; Randall G. Rueth (57) ABSTRACT

In a computer-implemented method of roofing material identification, image data corresponding to one or more images of roofing materials may be received. The image data may be processed to determine pertinent characteristics of the roofing materials. The determined characteristics and a characteristics database storing data indicative of associations between a plurality of roofing material products and characteristics of the plurality of roofing material products, may be used to identify a roofing material product associated with the pertinent characteristics. An indication of the identified roofing material product may be provided (e.g., to facilitate claim processing).

16 Claims, 3 Drawing Sheets

METHOD FOR FIELD IDENTIFICATION OF ROOFING MATERIALS

FIELD OF THE DISCLOSURE

The present disclosure generally relates to roofing materials, and, more specifically, to systems and methods for identifying roofing materials for insurance and/or other purposes.

BACKGROUND

Typically, when a customer experiences damage to the roof of his or her home (e.g., shingles lost or damaged due to high winds, a hail storm, a fallen tree, etc.) and files a claim with an insurance provider, the insurance provider will assign a representative to investigate the claim. The claim representative may be tasked with identifying/locating appropriate replacement materials in order to determine the appropriate payment to the customer. Because roof damage is often restricted to a particular portion or portions of the roof, and to avoid unnecessarily replacing roofing materials (e.g., shingles or tiles) on the entire roof, the claim representative may need to locate a roofing material product having the same style, color and quality as the product used on the undamaged remainder of the roof. If the same roofing material product is no longer manufactured, the claim representative may need to identify a roofing material product that is acceptably similar in appearance and quality to the roofing material product that was damaged.

Currently, for shingles, claim representatives attempt to manually identify the product (e.g., manufacturer and part number) by looking at the shingles and assessing characteristics such as the style (e.g., pattern), size, quality and color. Unfortunately, this can be a difficult task requiring a substantial amount of training and/or experience. While some experienced roofing professionals and certain commercial services may be able to identify a "match" with an existing product (i.e., an exact match, or a similar replacement product) with fairly high confidence, it may be costly, time consuming, or otherwise not feasible for an insurance provider to use such professionals and/or services. And while, in some instances, the release tape on the back of shingle tabs (or the back of tiles, panels, etc.) may have some limited identifying information, a destructive method may be required to access that information, and the information may be incomplete. If the product is misidentified, and/or a replacement product is not sufficiently similar in appearance and/or quality, the customer may be dissatisfied, and/or the insurance provider may need to arrange for a different roofing material product to be installed at an additional cost to the insurance provider.

BRIEF SUMMARY

The present embodiments may, inter alia, reduce costs to an insurance provider or other individual or entity, and/or increase customer satisfaction, by efficiently and accurately identifying roofing materials.

In one aspect, a computer-implemented method of roofing material identification may include receiving, by one or more processors, image data corresponding to one or more images of roofing materials, and processing, by one or more processors, the image data to determine pertinent characteristics of the roofing materials. The method may also include using, by one or more processors, (i) the determined characteristics, and (ii) a characteristics database storing data indicative of associations between a plurality of roofing material products and characteristics of the plurality of roofing material products, to identify a roofing material product associated with the characteristics. The method may further include providing, by one or more processors, an indication of the identified roofing material product to a computing device or system.

In another aspect, a system for roofing material identification may include a characteristics database, a communication interface, one or more processors, and a program memory. The characteristics database may store data indicative of associations between a plurality of roofing material products and characteristics of the plurality of roofing material products. The program memory may store instructions that, when executed by the one or more processors, cause the one or more processors to process image data received via the communication interface to determine pertinent characteristics of roofing materials. The image data may correspond to one or more images of the roofing materials. The instructions may also cause the one or more processors to use the determined characteristics and the characteristics database to identify a roofing material product associated with the characteristics, and provide, via the communication interface, an indication of the identified roofing material product to a computing device or system.

In another aspect, a mobile computing device may include an image capture device, an image memory configured to store images captured by the image capture device, a display, one or more processors, and another memory storing instructions. The instructions, when executed by the one or more processors, may cause the mobile computing device to present to a user of the mobile device, on the display, one or more interactive controls, and, in response to the user utilizing the one or more interactive controls, either (i) utilize the image capture device to obtain one or more images of roofing materials, or (ii) retrieve the one or more images of roofing materials from the image memory. The instructions may also cause the one or more processor(s) to transmit the one or more images to a remote server for processing and, in response to transmitting the one or more images, receive data indicating a roofing material product. The instructions may also cause the one or more processors to present to the user, on the display, an identifier of the roofing material product.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

DETAILED DESCRIPTION

I. Example Identification of Roofing Materials

The present embodiments generally relate to processing digital images of roofing materials to identify those roofing materials (e.g., to determine the manufacturer and/or part number of the roofing materials, and/or to determine one or more similar roofing material products). The identification or detection may occur "in the field." For example, an individual (e.g., claim handler or other insurance representative) may use a mobile device such as a smartphone or tablet to capture one or more images of a roof of a home, send the image(s) to a remote server (e.g., a server of an insurance provider or third party) via a wireless link, and receive from the server information indicating a matching and/or similar roofing material product or products. The mobile device may execute a software application that guides the individual through the process of taking one or more pictures of the roof, sending the picture(s) to the remote server (e.g., along with a request for roofing material identification), and/or receiving the appropriate information (e.g., the matching and/or similar product or products, etc.) from the server, for example.

To identify the roofing materials in a received image or images, the server may utilize one or more image processing techniques to determine a set of characteristics of the roofing materials. For asphalt shingles, for example, the server may determine a pattern of shingle tabs on the roof (e.g., a pattern corresponding to a standard "3-tab" pattern), a tab length, tab colors or shading, exposure width, and/or other characteristics. As another example, for clay or concrete roofing tiles, the server may determine tile length, tile width, and/or—if a substantially side-view of the tiles is available—a tile profile (e.g., the tile contour, as seen from the end or side of the tile). The server may then use the determined characteristic set to find, within a database, a roofing material product matching those characteristics (e.g., within a particular tolerance or set of tolerances), and/or to find products that do not qualify as a "match" but are similar (e.g., within a wider tolerance or set of tolerances).

The identification of the roofing material product(s), once determined by the server, may be used in various ways, in different embodiments and/or scenarios. For instance, an insurance claim representative may use the identified product(s) to estimate a replacement or repair cost for damage due to wind or other causes. As another example, an individual building an addition to a house may use the identified product(s) to match or approximate the appearance of the roof on the original portion of the house (or may be required to do so by local ordinance, etc.). As still another example, the identified product(s) may be used for purposes of identifying homes that have defective, recalled and/or dangerous roofing materials.

By using some or all of the above techniques, several advantages may be obtained. For example, an insurance claim representative may quickly form an accurate estimate of the cost of repairing a damaged roof. As a result, the insurance provider may avoid the costs and delays associated with hiring a professional or commercial service, and the insured may receive any payment (and/or approval of repair work, etc.) sooner. As another example, an insurance agent may be able to quickly provide a customer or potential customer with a premium quote (and/or other parameters of the policy, such as deductible amount) that accurately reflects the identified material.

II. Example System for Field Identification of Roofing Materials

Figure 1:
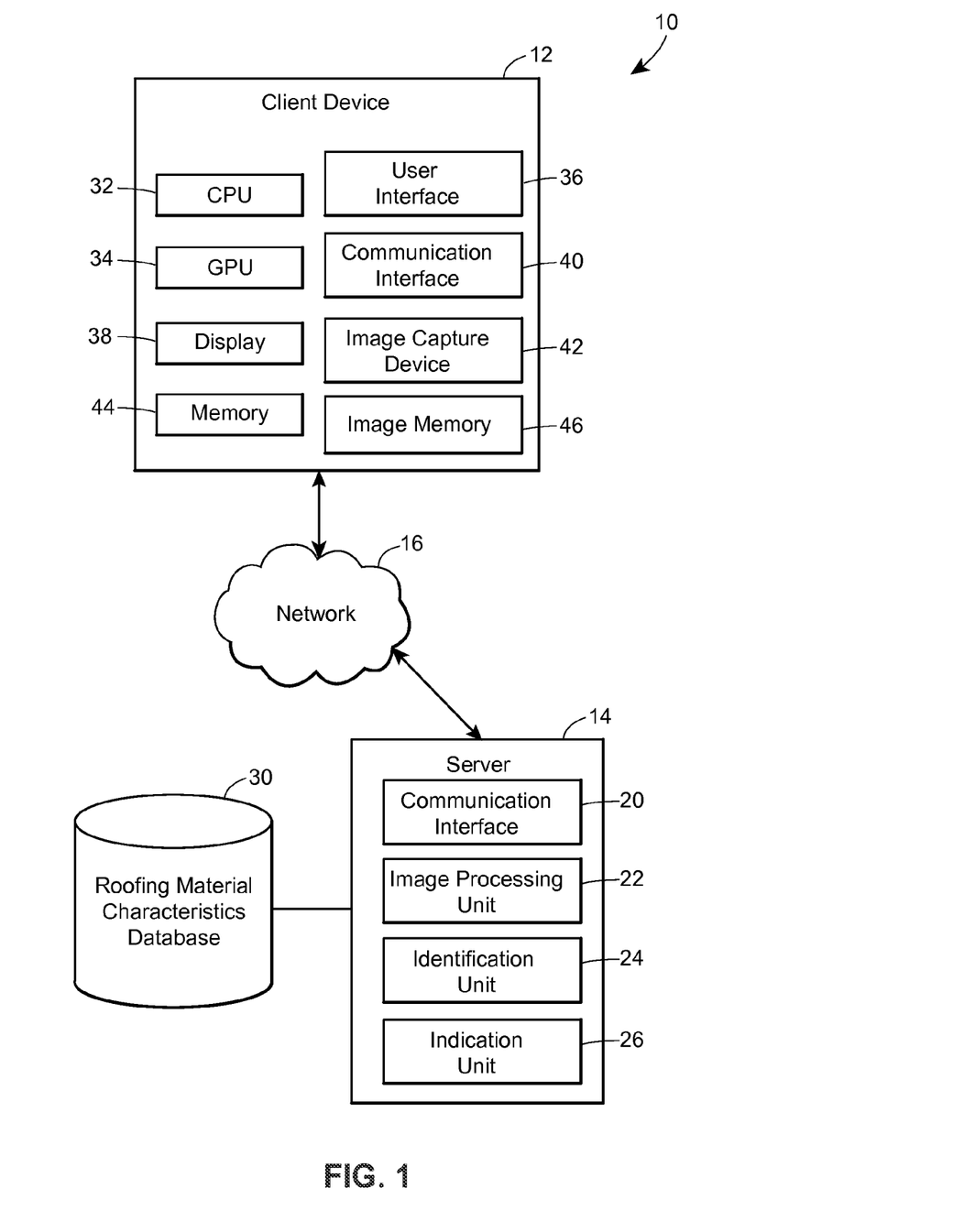
FIG. 1 is a block diagram of an example system for field identification of roofing materials, according to an embodiment.

FIG. 1 depicts an example system 10 for field identification of roofing materials, according to an embodiment. The system 10 may include a client device 12 configured to communicate with a server 14 via a network 16. Network 16 may include any suitable combination of wired and/or wireless communication networks, and may include any combination of one or more local area networks (LANs), metropolitan area networks (MANs), and/or wide area network (WANs). As just one example, network 16 may include a cellular network, the Internet, and a server-side LAN.

The server 14 may include a communication interface 20, an image processing unit 22, an identification unit 24, and an indication unit 26. In other embodiments, the server 14 may include additional, fewer, or different components and/or units than those shown in FIG. 1. The communication interface 20 may be configured to communicate with (i.e., transmit data to, and receive data from) remote computing devices, including client device 12, via network 16. The communication interface 20 may include multiple different communication interfaces, such as multiple hardware ports and associated software and/or firmware, for example. As will be discussed in greater detail below, image processing unit 22 may generally be configured to process images of roofing materials (including images received via communication interface 20) to determine characteristics of the roofing materials, identification unit 24 may generally be configured to identify the roofing materials based upon the determined characteristics (and a roofing material characteristics database 30 communicatively coupled to the server 14), and indication unit 26 may generally be configured to send information corresponding to the output of identification unit 24 to one or more computing devices (e.g., client device 12) and/or computing systems (e.g., a claim processing or underwriting system).

In an embodiment, each of units 22, 24 and 26 is (or includes) a respective set of one or more processors that executes software instructions to perform the functions described below, or some or all of the units 22, 24 and 26 may share a set of one or more processors. Alternatively, each of some or all of the units 22, 24 and 26 may be a component of software that is stored on a computer-readable medium (e.g., a non-volatile memory of the server 14) and executed by one or more processors of the server 14 to perform the functions described herein.

In an embodiment (e.g., if used for "field" identification of roofing materials), the client device 12 is a mobile/portable computing device, such as a smartphone, smart glasses, a tablet, a phablet, or a laptop, for example. While many client devices may communicate with the server 14 (e.g., for purposes similar to those described below with respect to the client device 12), for clarity FIG. 1 illustrates only a single client device. The client device 12 may include a central processing unit (CPU) 32, a graphics processing unit (GPU) 34, a user interface 36, a display 38, a communication interface 40, an image capture device 42, a memory 44, and an image memory 46. In other embodiments, however, the client device 12 may include additional, fewer, or different components and/or units than those shown in FIG. 1.

The memory 44 may include a computer-readable, non-transitory storage device having any combination of volatile (e.g., random access memory (RAM)) and/or non-volatile memory (e.g., read only memory (ROM), Flash, etc.). The memory 44 may store instructions that, when executed by the CPU 32 and/or the GPU 34, cause the CPU 32 and/or the GPU 34 to perform various acts, such as any of those described herein with respect to the client device 12. The image memory 46 may store images captured by image capture device 42, and or images obtained from an external source. The image memory 46 may include a non-volatile memory such as ROM or Flash memory, for example.

The display 38 may include a screen (e.g., smartphone or tablet screen, or laptop monitor) for displaying information to a user. The user interface 36 may be configured to enable a user to interact with the client device 12. For example, the user interface 36 may include an interactive feature of display 38 (e.g., display 38 may be a touchscreen), a keyboard, a voice input device, and/or any other suitable user-input device(s).

The communication interface 40 may include one or more communication interfaces, such as hardware, software and/or firmware of an interface for enabling communications via a cellular network, and/or hardware, software and/or firmware of an interface for enabling communications via a WiFi network (e.g., a cellular and/or WiFi network within network 16). The client device 12 may be configured to communicate with the server 14 via the communication interface 40.

The image capture device 42 may be configured to capture images in a digital format with any suitable number of pixels. The image capture device 42 may be implemented as a camera integrated within the client device 12 or, in some embodiments, may be external (and communicatively coupled) to the client device 12. In an embodiment where the client device 12 is a laptop computer, for example, the image capture device 42 may be a camera of a smartphone that is coupled to the client device 12 via a Bluetooth link.

In operation, an individual (e.g., an insurance claim representative, homeowner/insured, etc.) may operate the image capture device 42 (e.g., via user interface 36) to take one or more pictures of roofing materials. The roofing materials may be situated on a roof when photographed or, in some embodiments (e.g., depending upon whether characteristics such as exposure width or shingle tab pattern are analyzed, as described further below), may not be situated on the roof (e.g., if some shingle tabs or tiles blew off the roof and were recovered). The picture(s) may be stored as digital images in image memory 46, or another memory not shown in FIG. 1 (e.g., a cloud-based memory at a server remote from the client device 12 and server 14).

In some embodiments, the client device 12 may execute a dedicated software application (e.g., an application corresponding to instructions stored in memory 44) that facilitates field identification of roofing materials. In such an embodiment, the application may, when executed by CPU 32 and/or GPU 34, cause the display 38 to present to the user of the client device 12 a graphical user interface (GUI). The GUI may include one or more interactive controls that enable the user to capture the image(s) of the roofing materials with image capture device 42, and/or to select/retrieve image(s) previously captured by image capture device 42 (or another device) from image memory 46, or from another local or external (e.g., cloud-based) memory.

The image(s) of the roofing materials may be transferred from the client device 12 to the server 14 via any of various suitable methods. If the client device 12 is executing the dedicated application mentioned above, for example, the GUI may include a first interactive control that enables the user to either capture new roofing material images (e.g., using image capture device 42) or select previously-taken images stored in image memory 46, and a second interactive control that enables the user to send captured and/or selected images from the client device 12 to the server 14 (e.g., directly via communication interface 40 and network 16, or, in some embodiments, by causing a server associated with cloud storage or other storage to send the image(s) to server 14) along with a request for roofing material identification.

As another example, the user of client device 12 may select the image(s), attach the image(s) to an email, and send the email to an address associated with the server 14. In still other embodiments, the image(s) may be transferred to the server 14 in a less direct manner (e.g., by transferring the image file(s) to a portable memory device that couples to the client device 12, uploading the file(s) from the portable memory device to a second computing device not shown in FIG. 1, and then transmitting the file(s) from the second computing device to the server 14).

The image(s) may be received at the server 14 via communication interface 20. Once received, image processing unit 22 may utilize one or more image processing techniques to determine a set of characteristics of the roofing materials pictured in the image(s). Where the roofing materials comprise asphalt shingle tabs, for example, image processing unit 22 may determine a category or type of pattern of the shingle tabs (e.g., a pattern corresponding to a standard "3-tab" pattern, or an "architectural" pattern, etc.), an exposure width of the shingle tabs, and/or a shingle tab length. As another example, for clay or concrete roofing tiles, image processing unit 22 may determine tile length, tile width, and/or a tile profile. In other embodiments and/or scenarios, image processing unit 22 may determine other, or additional, characteristics of the pictured roofing materials. Some additional, example characteristics and roofing material types are described below in connection with FIGS. 2 and 3.

The image processing technique(s) utilized by image processing unit 22 may include any suitable image detection, feature detection/extraction, pattern detection, edge detection, corner detection, blob detection, ridge detection, color detection, and/or any other image processing technique(s) to determine the characteristic set. To provide just a few more specific examples, and as will be appreciated by those of ordinary skill in the relevant art(s), image processing unit 22 may implement a SIFT (Scale-Invariant Feature Transform) technique, a SURF (Speeded Up Robust Features) technique, and/or a Hough transform technique to determine the characteristic set.

If multiple images of the same roofing materials are received at the server 14 for processing, image processing unit 22 may use a "best" image (e.g., an image having the most lighting and/or sharpest focus, etc.). Alternatively, image processing unit 22 may use multiple images to determine more characteristics than could be ascertained from any one image (e.g., one image for tile length and/or width, and another image for tile profile), and/or may use the images for redundancy to help ensure the accuracy of the determined characteristics. Image processing unit 22 may also implement a normalization technique to ensure that any dimension-related characteristics (e.g., exposure width, tab or tile length, etc.) are determined in a manner that is consistent from image to image.

After image processing unit 22 has determined a set of characteristics of the pictured roofing materials, identification unit 24 may use the determined characteristic set to identify a roofing material product matching those characteristics, and/or to find one or more roofing material products that may not match the characteristic set exactly but are sufficiently "close." To identify the matching and/or similar products, identification unit 24 may access the characteristics database 30. The characteristics database 30 may be a non-volatile memory that stores one entry per known roofing material product, for example, with each entry including identifying information for the respective product (e.g., manufacturer and part number) and one or more characteristics known to be associated with that product (e.g., tab or tile length, recommended installation pattern, recommended exposure width, etc.). In different embodiments, the characteristics database 30 may include only a single database (e.g., a database maintained by an insurance provider), or may instead or additionally include one or more third party databases (e.g., databases maintained by the respective roofing material product manufacturers).

Identification unit 24 may then determine which of the products in the database are associated with characteristics that "match," or are sufficiently "similar" to, the characteristics of the characteristic set determined by image processing unit 22. The rules or algorithms for determining whether a particular product in the characteristics database 30 "matches" the characteristic set of the pictured roofing materials may vary according to different embodiments. In one embodiment, for instance, identification unit 24 may determine that a particular product is a "match" if the associated characteristics in database 30 are within predetermined tolerances of the corresponding characteristics in the characteristic set determined by image processing unit 22 (or vice versa). For example, if characteristics database 30 includes data indicating that "Product A" is a 3-tab asphalt composition shingle product that is a total of 36 inches in length and 12 inches in width, and has a recommended 5-inch exposure height and a 12-inch tab exposure length, identification unit 24 may conclude that Product A "matches" any roofing materials that are determined (by image processing unit 22) to have an exposure height between 4.9 and 5.1 inches, and a tab exposure length between 11.9 and 12.1 inches.

In another example embodiment, identification unit 24 may generate a vector based upon multiple roofing material characteristics determined by image processing unit 22, and compare that vector to like vectors of products represented in the characteristics database 30. For example, identification unit 24 may generate a test vector with one dimension per characteristic determined by image processing unit 22 (e.g., tab or tile length, exposure width, etc.), calculate a cosine similarity between that test vector and corresponding vectors for different products represented in characteristics database 30, and conclude that any product associated with a vector having at least a threshold cosine similarity to the test vector is a "matching" product.

Whether a roofing material product is "similar" (e.g., a good replacement/alternative) to the pictured roofing materials may be determined by similar rules or algorithms. For example, identification unit 24 may determine that a particular product is "similar" to the pictured roofing materials if the characteristics of that product are outside a "matching" tolerance, or below a "matching" cosine similarity threshold, but are within a second, looser tolerance, or above a second, lower cosine similarity threshold, respectively. In other embodiments, the entries for at least some of the products in characteristics database 30 include lists of replacement or alternative products having similar appearance and/or quality. In such an embodiment, identification unit 24 may first identify a "matching" product, and then also identify the product(s) that are listed in characteristics database 30 as suitable replacements or alternatives. In some embodiments, identification unit 24 only identifies "similar" roofing products if no "matching" products can be identified in database 30. In other embodiments, identification unit 24 identifies both any and all "matching" products, and any and all "similar" products, in each instance.

Once identification unit 24 has identified the matching and/or similar product(s), indication unit 26 may generate a message that lists the manufacturer and part number of each identified product, possibly also including an indication of whether each listed product is a "matching" product or merely "similar" (or a "replacement" or "alternative," etc.) to the roofing materials in the received image(s). Indication unit 26 may the cause the message to be sent to one or more computing devices and/or systems, depending on the embodiment and/or scenario. In an embodiment where the client device 12 executes a dedicated software application, for instance, indication unit 26 may cause the message to be transmitted to the client device 12 via communication interface 20 and network 16. The GUI shown on the display 38 of client device 12 may then present the identified product(s) (and, if available, the indication of whether each listed product is matching or merely "similar," etc.) to the user. In some embodiments, the GUI may also present other information, such as a cost per square foot of each product, or hyperlinks to websites relating to the product(s) (e.g., additional product description and/or product purchase information), for example. The additional information may be information that the indication unit 26 retrieved from characteristics database 30, and was sent to the client device 12 along with the product list, or may be information that the application retrieved directly from one or more other sources (e.g., from servers associated with manufacturers of the listed products).

In other embodiments, the indication unit 26 causes the message to be sent to another server of an insurance provider. The server receiving the message may use the information therein to automatically populate one or more data fields relating to a claim (e.g., to facilitate determining a repair or settlement cost).

While FIG. 1 has been described, at times, with reference to a dedicated software application executing on the client device 12, in other embodiments the client device 12 may utilize a web browser to access one or more web pages stored at server 14 (or another location not shown in FIG. 1). For example, the user of client device 12 may upload pictures of roofing materials, and receive information about any identified matching or similar replacement roofing materials, via the server-hosted web page(s).

Moreover, in some embodiments, roofing material product identification may be performed entirely, or almost entirely, by the client device 12. For example, the image processing unit 22, identification unit 24, and/or indication unit 26 may instead reside in the client device 12, and the client device 12 may communicate with the server 14 via network 16 in order to access the characteristics database 30 as needed. Alternatively, some or all of the characteristics database 30 may be downloaded to the client device 12 and stored in the memory 44 or another memory of client device 12. By incorporating more of the functionality of the invention into client device 12, problems due to unavailability of the network 16 may be reduced or avoided entirely.

As can be seen from the above discussion, the components in the system 10, when using the techniques described above, may shorten the time required to process a claim. As such, the resource usage or consumption of the components in the system 10 (e.g., in the client device 12 and/or the server 14) may be greatly reduced. For example, the number of processor cycles utilized by the client device 12, and the usage of memory 44, may be lessened by allowing the user of client device 12 to identify roofing material products without browsing various website images for purposes of making manual comparisons.

III. Example Images of Roofing Materials

Figure 2:
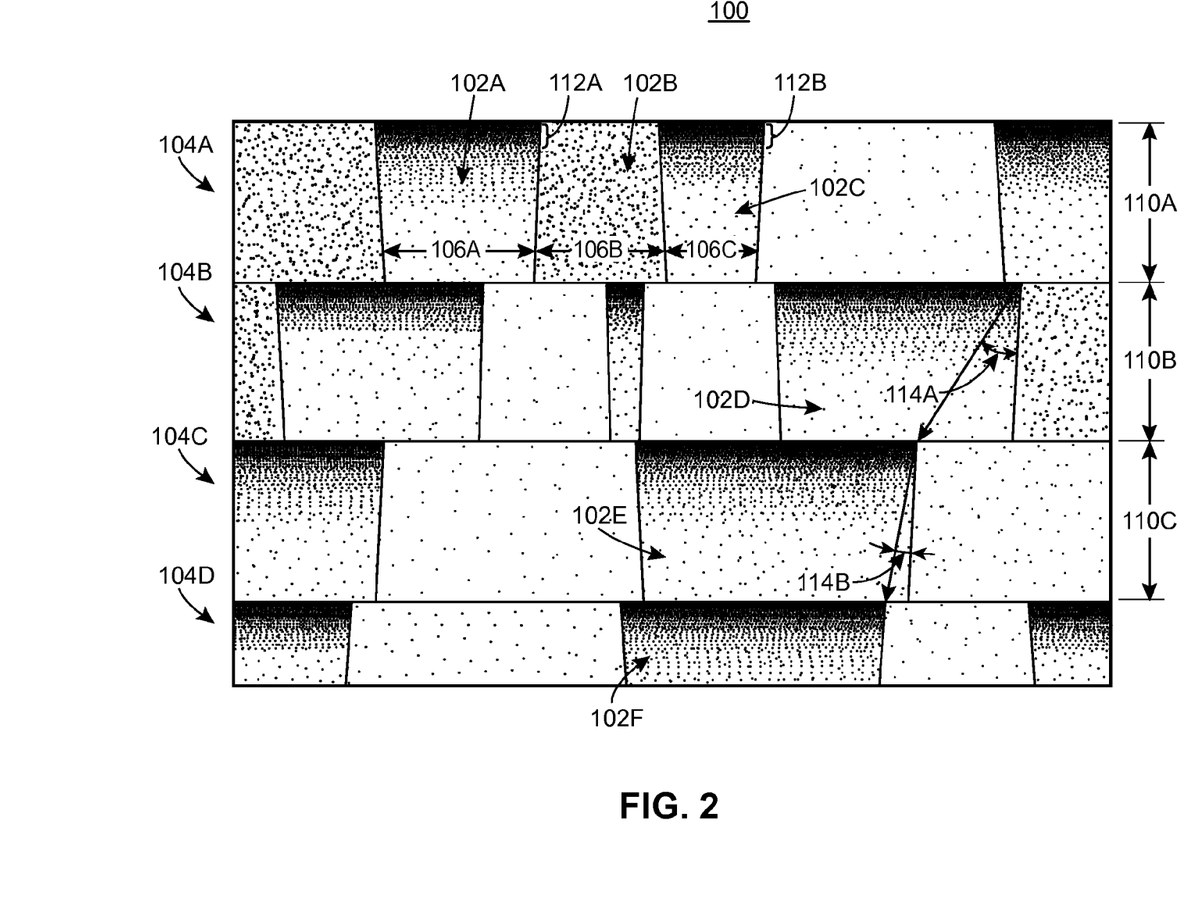
FIG. 2 depicts an example image of roofing materials.

FIG. 2 depicts an example image 100 of asphalt composition roofing materials, according to one scenario. The image 100 may be an image captured by image capture device 42 of FIG. 1, for example. FIG. 2 shows various example characteristics that may be determined by image processing unit 22 of FIG. 1 when processing the image 100.

More specifically, image processing unit 22 may determine characteristics of individual shingle tabs 102 arranged in rows 104, and/or characteristics of groups of the shingle tabs 102. For instance, image processing unit 22 may determine that a grouping of the tabs 102 is arranged in an "architectural" pattern. This determination may be made in various ways in different embodiments. For example, image processing unit 22 may determine that the tabs 102 are arranged in an architectural pattern simply by virtue of not being in any other known pattern (e.g., a standard "3-tab" pattern).

As another example, image processing unit 22 may determine a length 106 of each of one or more of the tabs 102 (e.g., length 106A of tab 102A, length 106B of tab 102B, length 106C of tab 102C, etc.). Image processing unit 22 may determine a length 106 for each tab 102 shown in the image 100, for example, or may omit the length determination for any of the tabs 102 that abut the left or right edge of the image 100.

As another example, image processing unit 22 may determine an exposure height or width 110 of the tabs 102 in each of one or more of the rows 104. Image processing unit 22 may determine an exposure width 110 for each row 104 shown in the image 100, for example, or may omit the exposure width determination for any of the rows 104 that abut the top or bottom edge of the image 100 (e.g., row 104D).

As another example, image processing unit 22 may determine a shadow width 112 for each of one or more tabs 102 (e.g., shadow width 112A of tab 102A, shadow width 112B of tab 102C, etc.). The shadow width may be indicative of other characteristics, such as how far the tabs 102 of one row 104 protrude from the roof relative to the tabs 102 of a lower, adjacent row 104. Image processing unit 22 may also determine a pattern of which tabs 102 have a relatively thick shadow width 112 (e.g., in FIG. 2, every other tab 102 when proceeding left to right), which may be indicative of the pattern in which the shingle tabs 102 are laid out (e.g., which of the tabs 102 are partially covered by other of the tabs 102). In some embodiments, the presence or dimensions of shadow widths 112 are used to determine the tabs 102 for which a length 106 should be calculated. For example, image processing unit 22 may decide to determine length 106B in response to determining that tab 102B does not have a substantial shadow width, and decide to not determine lengths 106A and 106C in response to determining that the shadow widths 112A and 112B of tabs 102A and 102C, respectively, are sufficiently wide to indicate that tabs 102A and 102C are partially covered.

As yet another example, image processing unit 22 may determine an offset angle 114 between tabs 102 of adjacent rows 104. For example, image processing unit 22 may measure offset angle 114A between tabs 102D and 102E, and measure offset angle 114B between tabs 102E and 102F. While FIG. 2 shows offset angle 114A being measured from the upper right corner of tab 102D to the upper right corner of the tab 102E (with a similar measurement for offset angle 114B), any other suitable measurement technique may be used (e.g., mid-point to mid-point, upper corner to mid-point, etc.). In some embodiments, the presence or dimensions of shadow widths 112 are used to determine the tabs 102 for which an offset angle 114 should be calculated. For example, image processing unit 22 may decide to determine offset angles 114A and 114B in response to determining that tabs 102D, 102E and 102F (1) have substantial shadow widths 112 and (2) are partially overlapping along the horizontal axis.

As still another example, image processing unit 22 may determine a color and/or shading of granules on one or more of the tabs 102, a variety of colors and/or shading of granules on one or more of the tabs 102, a distribution of colors and/or shading of granules on one or more of the tabs 102, and so on.

In other embodiments, image processing unit 22 may also, or instead, determine one or more characteristics of the roofing materials other than those shown in FIG. 2 and discussed above. For example, image processing unit 22 may determine offset distances between tabs 102 in adjacent rows 104 (rather than, or in addition to, offset angles 114), and/or shapes of one or more of the tabs 102, etc.

If multiple characteristics of one type are determined (e.g., multiple lengths 106 corresponding to multiple tabs 102), image processing unit 22 may also determine one or more characteristics that reflect metrics associated with those underlying characteristics. For example, image processing unit 22 may determine an average of the lengths 106, a maximum and/or minimum of the lengths 106, a standard deviation of the lengths 106, etc. As other examples, image processing unit 22 may determine an average of the exposure widths 110, a maximum and minimum of the offset angles 114, and so on.

Once image processing unit 22 determines the appropriate characteristic(s) of the roofing materials shown in the image 100, identification unit 24 may use the characteristic(s) to identify the manufacturer and/or part number of a product "matching" the shingle tabs 102, and/or the manufacturer and/or part number of one or more "similar" products, as described above in connection with FIG. 1 (e.g., using information stored within the characteristics database 30).

While FIG. 2 depicts asphalt composition shingles, the present invention may also, or instead, identify matches and/or similar products for other types of roofing materials. Different types of roofing materials, and various characteristics that may be determined for each, are discussed in more detail below in connection with FIG. 3. A user may indicate the type of roofing materials when submitting pictures (e.g., by selecting a "type" from a drop-down menu before pressing a virtual "submit" button on the screen of the user's mobile computing device), for example, or image processing unit 22 may automatically determine the type of roofing materials based on detected characteristics.

IV. Example Methods of Roofing Material Identification

Figure 3:
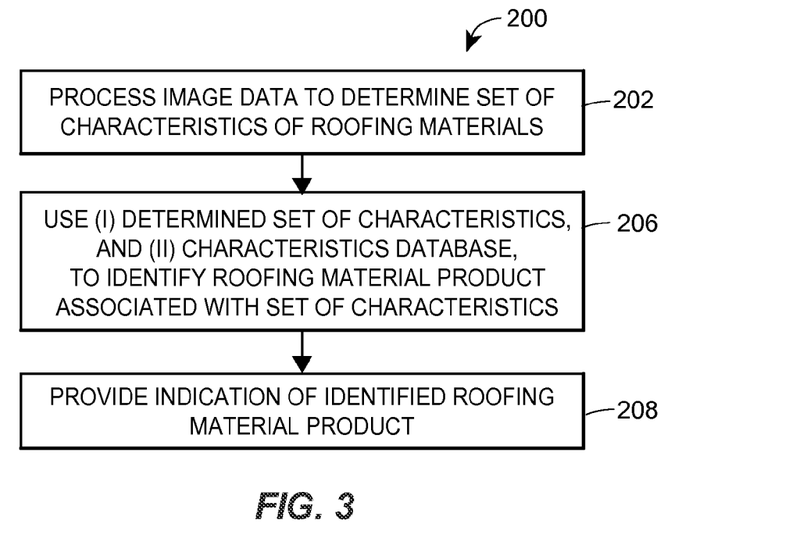
FIG. 3 depicts a flow diagram of an example method of roofing material identification from a server-side perspective, according to an embodiment.

FIG. 3 depicts a flow diagram of an exemplary method 200 for identifying roofing materials. In one embodiment, the method 200 may be implemented in (e.g., performed by one or more processors of) a server, such as server 14 of FIG. 1, for example.

In the method 200, image data corresponding to one or more images of roofing materials may be received (block 202). The image data may be received via a communication interface, such as the communication interface 20 of FIG. 1, for example. In some embodiments and/or scenarios, the image data may be received from a mobile device that captured the image(s) (e.g., a mobile device having a camera and executing a software application that facilitates identification of roofing materials), or any other suitable computing device (e.g., as described above in connection with client device 12 of FIG. 1). The roofing materials may be in situ on a roof, or may not be in situ, depending on the scenario and/or the embodiment. The roofing materials may be asphalt shingles, metal shingles, synthetic or alternative shingles (e.g., vinyl, plastic or rubber), metal sheets or panels, concrete roofing tiles, clay roofing tiles, slate roofing, or any other type of known roofing material.

The received image data may be processed to determine a set of pertinent characteristics of the roofing materials (block 204). The set of characteristics may include any characteristics suitable for distinguishing one roofing material product from some or all other roofing material products. For asphalt shingles, for example, the set of characteristics may include shingle tab length and/or width, shingle tab exposure length and/or width, shingle tab shape (e.g., rectangular, dragon tooth shape, etc.), shingle tab cutout length and/or width, shingle texture, and/or shingle color. As another example, the set of characteristics may include a distribution or variety of shingle colors (e.g., for granule colors on shingle tabs). As yet another example, the set of characteristics may include an offset (e.g., offset distance and/or angle) between shingle tabs in adjacent shingle tab rows in the image. In other examples, the set of characteristics may include dimensions of shadow lines between shingle tabs in adjacent shingle tab rows in the image, and/or locations of the shadow lines. In still other embodiments, one or more other suitable characteristics may also, or instead, be determined. The set of characteristics may also include characteristics that are determined based on other characteristics. For example, the set of characteristics may include an average length, exposure, width, etc., of shingle tabs in the image, and/or may include a minimum and/or maximum length, exposure, width, etc., of shingle tabs in the image.

Other characteristics may be determined for other types of roofing materials. Other possible types of roofing materials, and some of their possible characteristics, may include:

CONCRETE ROOFING TILE
- LENGTH—Tile length measured from the face, top to bottom.
- WIDTH—Tile width measured from side to side (may be multiple widths if tapered).
- PROFILE—The tile contour, as seen from the end or side of the tile.
  - Barrel—Resembles half a barrel.
  - Beveled Flat—A flat concrete tile with beveled edges
  - Double Roll—Also called a Double Roman; when viewed from top or bottom, resembles a "W."
  - Flat
  - Large S—The "S" curve in the tile is much larger and has a higher profile than the Spanish S tile.
  - Sculptured—A flat tile with raised portions on the surface (e.g., board and batten appearance).
  - Spanish S—Resembles an "S" if viewed from end. The curve aligns with the trough, or flat portion, of the tile beside it.
- FINISH—Final surface preparation, before a texture is applied to a tile, for the exposed portion of the tile.
  - Natural—Free from surface treatment (this applies to the finish only).
  - Slurry—Has surface coating created from liquid cement and water mix. Tile resembles an orange peel.
  - Antiquing—Process applied to tile before drying, wherein a colorant is applied on top of finished tile to create old, aged look (and appears as "streaks" in the tile).
- STYLE—Coating or color of the tile.
  - Color Through—The mixture of colorants put in the wet concrete before the tile was formed.
  - Color Through Blend—Same as color through, but with multiple base color tiles that make up the blend.
  - Natural Concrete—Uncolored and untinted concrete tile, gray in color.
  - Slurry Coated—A liquid cement, paint pigment, and water mix, used as a coating that flows over the concrete as it is being produced.
- TEXTURE—The surface characteristics on the tile that are exposed to the weather.
  - ½ Smooth ½ Ribbed—Specialty effect applied to tile (half of tile is smooth, other half has raised ribs).
  - ½ Smooth ½ Rough—Specialty effect applied to tile (half of tile is smooth, other half has rough texture).
  - Broom Swept—Surface texture created by stroking a broom over the tile during the curing process (generally has wave pattern to lines created by broom).
  - Machine Grooved—Grooves are evenly spaced and of uniform depth.
  - Orange Peel—Pitted texture resembling surface of a rough orange peel.
  - Ribbed—Long, straight, narrow bands projecting from the surface of the tile.
  - Rough—Surface marked by irregularities or roughness.
  - Shake Look—Same appearance as a cedar shake.
  - Slate Look—Same appearance as slate tile.
  - Smooth—Free from irregularities or roughness.
- LOCK SHAPE/DIMENSIONS—Shape and/or dimensions of the channeled, ribbed or configured portion of the front and back of the tile that secure the tile and create a bond to the roof.
- LUG SHAPE/DIMENSIONS—Shape and/or dimensions of the extended portion located on the top back of the tile which fits against the batten.
- HEAD LAP SHAPE AND/OR DIMENSIONS—Shape and/or dimensions of the portion of the tile that laps over the top of the tile below it.
- MANUFACTURER—Name or insignia of the company that produced the tile, stamped on the back of the tile.

CLAY ROOFING TILE
- LENGTH—Tile length measured from the face, top to bottom.
- WIDTH—Tile width measured from side to side (may be multiple widths if tapered).
- PROFILE—The contour of the tile, as seen from the end or side of the tile.
  - Barrel—Resembles half a barrel.
  - Double Roll—Also called a Double Roman; when viewed from top or bottom, resembles a "W."
  - Flat—Flat tile.
  - Large S—The "S" curve in the tile is much larger and has a higher profile than the Spanish S tile.
  - Sculptured—Tiles having the appearance of columns when placed upright (e.g., French, Greek or Roman clay tiles).
  - Spanish S—Resembles an "S" if viewed from end. The curve aligns with the trough, or flat portion, of the tile beside it.
  - Tapered Barrel—Resembles half a barrel that is wider at the bottom than the top.
- FINISH—Final surface preparation, before a texture is applied to the tile, for the exposed portion of the tile.
  - Glazed—A coating of transparent or colored material applied to clay tiles prior to firing.

Natural—Free from surface treatments (this applies to the finish only).
Rustic—Surface treatments applied to give tile an aged appearance.
Sand—Tiles that appear to have been coated with sand or fine granular material.
STYLE—Refers to the color or coating of clay tile.
Blend—Process of creating colors in the tile during production. It may be applied as a glaze and may also have surface texture treatment.
Solid Color—Tile has one solid color throughout.
TEXTURE—The surface characteristics on the tile that are exposed to the weather.
Cratered and Sanded—Tile has small aggregates applied and removed, then struck again to remove all ridges around the craters.
Deep Fluted—Grooves that have been scored into the face of the tile.
Fine Machine Scored—The formed surface of the tile is scored to create a surface which removes the sheen of the clay tile body.
Hand Roughed (Hand Rough or Hand Scoring)—Surface is deeply raked by hand in a random pattern using a metal comb-like tool to create furrows.
Hand Treated Irregular—Tiles are made by hand; may have irregular/random dimensions and may include handprints.
Rough—Having a surface marked by irregularities or roughness.
Shake Look—Same appearance as a cedar shake.
Slate Look—Same appearance as a slate tile.
Smooth—Surface free of irregularities or roughness.
Smooth/Pebble—Tile was smooth at time of production but then small pebbles added to achieve this effect.
Smooth/Sanded—Both smooth and sanded textures applied to different exposed areas of the tile.
Treebark—Tile with irregular surface that resembles tree bark.
BACK CONFIGURATION—Varies from manufacturer to manufacturer.
MANUFACTURER—Name or insignia of the company that produced the tile, if stamped on the product.
SLATE ROOFING
SIZE OF SLATE—E.g., length and width.
TEXTURE—Caused by variations in the thickness of the individual slates over the entire roof as a whole.
COLOR
METAL SHINGLES
LENGTH—Shingle length from top edge to bottom edge.
WIDTH—Shingle width from side to side.
FINISH—Final surface preparation of the product.
Galvanized/Aluminum Finish—Free from surface treatment (this applies to the finish only).
Painted—Color process applied to top surface.
Granular—Application of stone coating granules to top surface.
STYLE—Appearance or shape of roofing material, as seen from top or face.
Diamond—A square or parallelogram with four equal sides that is usually oriented with a long diagonal vertical.
Half Rounds—Sculptured roofing that is curved at the bottom (also referred to as "scallops" or "fish scale").
Laminated Architectural—Resembles a composition laminated architectural shingle.
Shake—Simulates a hand-split cedar shake.
Shingle—Simulates a sawn cedar shingle.
Slate—Simulates natural slate.
Thatch—A sheltering cover that resembles straw.
Tile—Simulates clay or concrete profile tile.
EXPOSURE—Metal shingle are applied to a roof in horizontal courses, one placed and secured and another placed and secured on top of the one beneath it, leaving the lower part of the shingle exposed. Exposure may be measured perpendicularly, from the bottom of the shingle up to the course above.
FACE MEASUREMENT—Measurement of a single course within the overall exposure of the product.
MANUFACTURER—Name or insignia of the company that produced the product, if stamped on the product.
MATERIAL—Elements or substances from which the roofing product is made (presents as color, and possibly other characteristics).
Aluminum
Copper
Stainless Steel
Steel
METAL SHEETS OR PANELS
FACE—Measurement may be from center of one rib to center of next rib, or complete horizontal width of the panel (e.g., on board and batten or vertical panels).
FINISH—Final surface preparation of the product.
Galvanized/Aluminum Finish—Free from a surface treatment (this applies to the finish only).
Painted—Color process applied to top surface.
Granular—Application of stone coating granules to top surface.
MANUFACTURER—Name or insignia of the company that produced the product, if stamped on the product.
MATERIAL—Elements or substances from which the roofing product is made (presents as color, and possibly other characteristics).
Aluminum
Copper
Stainless Steel
Steel
PROFILE—E.g., panel/sheet width, from end view.
STYLE—Contour of roofing as seen from top or end of panel.
Board & Batten—Vertical panels using wide boards and narrow boards (battens) covering joints between wide boards.
Curved—Concave or convex style, with or without ribs.
Standing-Seam—Individual panel surface is flat or flush, run the length of the roof with ribbing up each side of the panels.
Ribbed—Rib projects from the surface.
Corrugated—Surface has peaks and valleys which may be equal in height, width, and depth.
Tile—Simulates clay or concrete profile tile.
Striated—Panel has grooves or channels that are in a parallel series between the ribs.
RIBBED HEIGHT—The measurement is from flat surface of panel to top of rib.
EXPOSURE—Measurement from one panel edge to the overlapping edge of the next panel.
SYNTHETIC OR ALTERNATIVE SHINGLES
MATERIAL—Recycled vinyl, or plastic or rubber.
STYLE—Shake or slate.
PROFILE
EXPOSURE
FACE MEASUREMENT

FINISH

WIDTH

LENGTH

MANUFACTURER—Name or insignia of the company that produced the product, if stamped on the product.

As will be appreciated by one of ordinary skill in the art, some of the characteristics listed above may be determined by capturing an image of the roofing materials in situ, while others (e.g., name or insignia of manufacturer stamped on back of product) may require capturing an image of the back of the roofing material.

The processing to determine the roofing material characteristics may be performed using any suitable technique(s). For example, the processing may be performed using image detection, feature detection or extraction, pattern detection, edge detection, corner detection, blob detection, ridge detection, color detection, and/or any other image processing technique(s).

The set of characteristics determined at block 204 may be used, along with a characteristics database, to identify a roofing material product associated with the determined characteristic(s) (block 206). The characteristics database (e.g., characteristics database 30 of FIG. 1) may store data indicative of associations between various roofing material products and characteristics of those products, for example, and the product identified at block 206 may be identified from among the products stored in the characteristics database. The identified product may be the product, of the products stored in the characteristics database, that best matches the set of characteristics determined at block 204, for example.

In some embodiments and/or scenarios, multiple roofing material products may be identified in the characteristics database at block 206 (e.g., a number of candidate/potential matches, or a "best match" product and a number of similar replacement products, etc.). In some embodiments/scenarios where one or more replacement products are identified, block 206 may include both identifying one or more products that "match" the set of characteristics (e.g., within a first set of tolerances), and identifying one or more products that are "similar" to the set of characteristics (e.g., within a second, looser set of tolerances). In other embodiments, block 206 may include first identifying one or more products that "match" the set of characteristics, and then using knowledge of the "matching" product(s) to identify one or more "similar" or "alternative" replacement products. The "similar" or "alternative" replacement products may be listed in the characteristics database as acceptable replacements in an entry corresponding to the matching product, for example.

In some embodiments, other types of information about the roofing materials may also be used to identify the matching product. For example, the location of the home or building on which the roofing materials are situated may be used, along with the determined characteristic set, to identify the matching product. The home/building location may be approximated using a self-locating technology (e.g., GPS) of a mobile device that captured the image(s), for instance, and may be provided along with the image data for analysis. The characteristics database, or another database, may store information indicating the areas (e.g., zip codes, states, etc.) in which each product is available or typically available, and a product may be identified as "matching" only if available (or typically available) in an area that includes the approximated home/building location. In other embodiments, home/building location may be determined in other ways, such as manual entry of the home/building address via a graphical user interface (e.g., by a user of a mobile device that was used to capture the roof image(s)).

Once the roofing material product is identified, an indication of the product may be provided (block 208). The indication may be any electronic data or message that is provided to any computer device or computer system, via any suitable sort of network (e.g., network 16 of FIG. 1), for example. In some embodiments and/or scenarios where the image data was received at block 202 from a mobile device, for example (e.g., from client device 12 and via communication interface 20 of FIG. 1), the indication may be provided to that mobile device in order to help the mobile device owner (e.g., an insurance provider employee) identify the type of roofing materials that should be used to repair the roof (or to add an addition to a home, etc.). In another embodiment, the indication may be provided to a computing system of an insurance provider (e.g., a claims processing system, in order to help determine an estimated cost of repair for a damaged roof).

In other embodiments, the method 200 is implemented entirely in a client device, such as client device 12 of FIG. 1. For example, the CPU 32 may receive the image data from image capture device 42 (or from another application executing on the client device 12, such as a photo management tool) at block 202, and the CPU 32 may process that image data to determine the set of characteristics at block 204. Thereafter, the CPU 32 (and/or another processor of client device 12) may, at block 206, access the characteristics database to identify the roofing material product by either communicating with a remote server (e.g., server 14) via communication interface 40, or by accessing an internal database stored in memory 44 or elsewhere in client device 12. The GPU 34 (and/or another processor of client device 12) may then provide the indication of the identified roofing material product to the user at block 208 by displaying the product to the user via the display 38.

Figure 4:
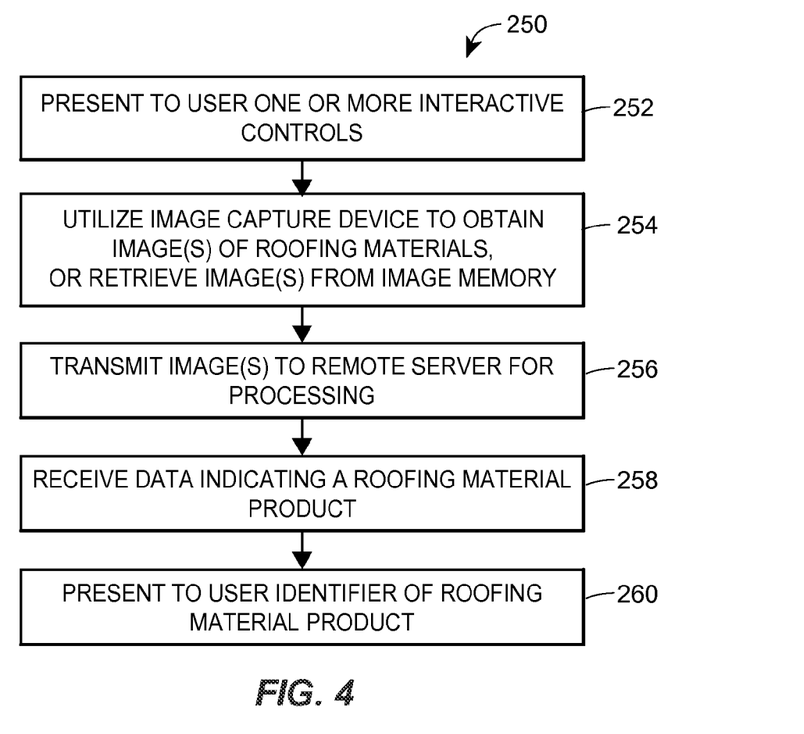
FIG. 4 depicts a flow diagram of an example method of roofing material identification from a client-side perspective, according to an embodiment.

FIG. 4 depicts a flow diagram of an exemplary method 250 for identifying roofing materials from a client-side perspective. In one embodiment, the method 250 may be implemented by (e.g., performed by one or more processors of) a mobile computing device, such as client device 12 of FIG. 1, for example.

In the method 250, a user of a mobile computing device (e.g., client device 12 of FIG. 1) may be presented with one or more interactive controls on a display (e.g., display 38 of FIG. 1) (block 252), and, in response to the user utilizing the interactive control(s), an image capture device of the mobile computing device (e.g., image capture device 42 of FIG. 1) may be utilized to obtain one or more images of the roofing materials (block 254). Alternatively at block 254, the image(s) may be retrieved from an image memory of the mobile computing device (e.g., image memory 46 of FIG. 1). The controls may include any suitable virtual buttons, drop-down menus, and/or other types of controls that allow the user of the mobile computing device to obtain or select images of roofing materials to be used/processed for product identification. As one specific example, the controls may include a "Capture" button that enables the user to use his or her device's camera to capture one or more new images of the roofing materials, and a "Browse" button that enables the user to instead select one or more images already stored in a memory of the mobile computing device (or in cloud storage, etc.).

After the image(s) has/have been captured, selected and/or retrieved, the image(s) may be transmitted to a remote server (e.g., server 14 of FIG. 1) for processing (block 256). For example, the mobile computing device may transmit the image(s) via a network similar to network 16 of FIG. 1 when the user selects a virtual "Submit" button on the display, or may automatically transmit the image(s) as soon as the image(s) is/are identified (e.g., as soon as the user selects an image file from memory, etc.).

In response to transmitting the image(s), data indicating a roofing material product may be received (block 258). The roofing material product may have been identified by the remote server using a method similar to the method 200 of FIG. 3, for example. The data may also represent other information, such as whether the product is a "matching" product or a "similar" product. In some embodiments and/or scenarios, the data is indicative of multiple roofing material products (e.g., a set of products similar to the roofing materials in the image(s)).

An identifier of the roofing material product may then be presented to the user on the display of the mobile computing device (block 260). If the data received at block 258 indicates multiple products, each of those products may be presented to the user. Moreover, if the data received at block 258 indicates whether an identified product is a "match" or merely "similar," that information may also be presented on the display.

In some embodiments, the method 250 also includes other blocks not shown in FIG. 4. For example, the method 250 may include a first additional block in which a user input indicative of a type of roofing materials is detected, and a second additional block in which data indicating the type of roofing materials is transmitted to the remote server (e.g., along with the data transmitted at block 256). Using this information, the remote server may be able to more accurately identify the pictured roofing materials. For example, the indication of "type" may permit the remote server to select an appropriate algorithm (e.g., an algorithm that determines characteristics appropriate to the type of roofing materials that are pictured).

V. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

The patent claims at the end of this patent application are not intended to be construed under 35 U.S.C. §112(f) unless traditional means-plus-function language is expressly recited, such as "means for" or "step for" language being explicitly recited in the claim(s).

What is claimed:

1. A computer-implemented method of roofing material identification, the method comprising:
   receiving, by said one or more processors, image data corresponding to one or more images of roofing materials;
   receiving, by said one or more processors, a user selection of a type of roofing materials;
   selecting, by said one or more processors, an algorithm corresponding to the user-selected type of roofing materials;
   processing, by said one or more processors and using the selected algorithm, the image data to determine a set of characteristics of the roofing materials;
   using, by said one or more processors, (i) the determined set of characteristics, and (ii) a characteristics database storing data indicative of associations between a plurality of roofing material products and characteristics of the plurality of roofing material products, to identify a roofing material product associated with the set of characteristics; and
   providing, by one or more processors, an indication of the identified roofing material product to a computing system of an insurance provider to facilitate determination of an estimated cost of repair or settlement associated with the roofing materials, wherein providing the indication to the computing system includes causing the computing system to automatically populate one or more data fields relating to an insurance claim.

2. The computer-implemented method of claim 1, wherein the roofing materials comprise shingles, and wherein processing the image data to determine a set of characteristics of the roofing materials includes processing the image data to determine one or more of (i) a shingle tab length, (ii) a shingle tab width, (iii) a shingle tab exposure length, (iv) a shingle tab exposure width, (v) a shingle tab cutout length, (vi) a shingle tab cutout width, (vii) a shingle tab shape, (viii) a shingle color, (ix) a distribution or variety of shingle colors, (x) a shingle texture, (xi) an offset between shingle tabs in adjacent shingle tab rows, (xii) dimensions of shadow lines between shingle tabs in adjacent shingle tab rows, or (xiii) locations of the shadow lines.

3. The computer-implemented method of claim 1, wherein the roofing materials comprise shingles, and wherein processing the image data to determine the set of characteristics of the roofing materials includes processing the image data to determine three or more of (i) a shingle tab length, (ii) a shingle tab width, (iii) a shingle tab exposure length, (iv) a shingle tab exposure width, (v) a shingle tab cutout length, (vi) a shingle tab cutout width, (vii) a shingle tab shape, (viii) a shingle color, (ix) a distribution or variety of shingle colors, (x) a shingle texture, (xi) an offset between shingle tabs in adjacent shingle tab rows, (xii) dimensions of shadow lines between shingle tabs in adjacent shingle tab rows, or (xiii) locations of the shadow lines.

4. The computer-implemented method of claim 1, wherein the roofing materials comprise shingles, and wherein processing the image data to determine the set of characteristics of the roofing materials includes processing the image data to determine an average value for a characteristic of shingle tabs.

5. The computer-implemented method of claim 1, wherein the roofing materials comprise tiles, and wherein processing the image data to determine the set of characteristics of the roofing materials includes processing the image data to determine two or more of (i) a tile length, (ii) a tile width, (iii) a tile profile, or (iv) a tile texture.

6. The computer-implemented method of claim 1, wherein the roofing materials comprise slate roofing materials, and wherein processing the image data to determine the set of characteristics of the roofing materials includes processing the image data to determine one or both of a slate size and a slate color.

7. The computer-implemented method of claim 1, wherein:
receiving image data includes receiving, via a communication interface, the image data from a mobile device that captured the one or more images of the roofing materials; and
providing an indication of the identified roofing material product includes sending an additional indication of the identified roofing material to the mobile device via the communication interface.

8. The computer-implemented method of claim 1, wherein:
receiving image data includes receiving the image data from a camera of a mobile device that captured the one or more images of the roofing materials; and
providing an indication of the identified roofing material product includes providing an additional indication of the identified roofing material to a user of the mobile device via a display of the mobile device.

9. The computer-implemented method of claim 1, wherein:
using the determined set of characteristics and the characteristics database to identify a roofing material product associated with the set of characteristics includes identifying a roofing material product, from among the plurality of roofing material products, that best matches the set of characteristics.

10. The computer-implemented method of claim 1, wherein the roofing material product is an alternative roofing material product, and wherein using the determined set of characteristics and the characteristics database to identify the alternative roofing material product includes:
using the determined set of characteristics and the characteristics database to identify a first roofing material product matching the set of characteristics; and
using the identified first roofing material product and the characteristics database to identify the alternative roofing material product.

11. The computer-implemented method of claim 1, wherein:
using the determined set of characteristics and the characteristics database to identify a roofing material product associated with the set of characteristics includes identifying a plurality of candidate roofing material products from among the plurality of roofing material products.

12. A system for roofing material identification, the system comprising:
one or more processors; and
a program memory storing instructions that, when executed by the one or more processors, cause the one or more processors to
select an algorithm corresponding to a user-selected type of roofing materials,
process image data corresponding to one or more images of roofing materials, using the selected algorithm, to determine a set of characteristics of the roofing materials,
use the determined set of characteristics and a characteristics database to identify a roofing material product associated with the set of characteristics, wherein the characteristics database stores data indicative of associations between a plurality of roofing material products and characteristics of the plurality of roofing material products, and
provide an indication of the identified roofing material product to a computing system of an insurance provider to facilitate determination of an estimated cost of repair or settlement associated with the roofing materials, wherein providing the indication to the computing system includes causing the computing system to automatically populate one or more data fields relating to an insurance claim.

13. The system of claim 12, wherein the roofing materials comprise shingles, and wherein the set of characteristics of the roofing materials includes one or more of (i) a shingle tab length, (ii) a shingle tab width, (iii) a shingle tab exposure length, (iv) a shingle tab exposure width, (v) a shingle tab cutout length, (vi) a shingle tab cutout width, (vii) a shingle tab shape, (viii) a shingle color, (ix) a distribution or variety of shingle colors, (x) a shingle texture, (xi) an offset between shingle tabs in adjacent shingle tab rows, (xii) dimensions of shadow lines between shingle tabs in adjacent shingle tab rows, or (xiii) locations of the shadow lines.

14. The system of claim 12, wherein the roofing materials comprise shingles, and wherein the set of characteristics of the roofing materials includes three or more of (i) a shingle tab length, (ii) a shingle tab width, (iii) a shingle tab exposure length, (iv) a shingle tab exposure width, (v) a shingle tab cutout length, (vi) a shingle tab cutout width, (vii) a shingle tab shape, (viii) a shingle color, (ix) a distribution or variety of shingle colors, (x) a shingle texture, (xi) an offset between shingle tabs in adjacent shingle tab rows, (xii) dimensions of shadow lines between shingle tabs in adjacent shingle tab rows, or (xiii) locations of the shadow lines.

15. The system of claim 12, further comprising a communication interface, wherein the instructions cause the one or more processors to:
process image data received via the communication interface from a mobile device that captured the one or more images of the roofing materials; and provide an additional indication of the identified roofing material product by sending the additional indication to the mobile device via the communication interface.

16. The system of claim 12, further comprising a display, wherein the display, the one or more processors, and the program memory are included in a mobile device that captured the one or more images of the roofing materials, and wherein the instructions cause the one or more processors to:
provide an additional indication of the identified roofing material product to a user of the mobile device via the display.

* * * * *